May 27, 1969

C. H. SNYDER, JR 3,446,245

THREADED FLUID COUPLING

Filed Feb. 28, 1966

INVENTOR.
CLIFFORD H. SNYDER, JR.
BY George Raynovich Jr
HIS ATTORNEY

INVENTOR.
CLIFFORD H. SNYDER, JR.
BY George Raymarch
HIS ATTORNEY

United States Patent Office 3,446,245
Patented May 27, 1969

3,446,245
THREADED FLUID COUPLING
Clifford H. Snyder, Jr., Coraopolis, Pa., assignor to SRM Company, a corporation of Pennsylvania
Filed Feb. 28, 1966, Ser. No. 530,504
Int. Cl. F16l 29/00, 37/28
U.S. Cl. 137—614.03          1 Claim

ABSTRACT OF THE DISCLOSURE

A threaded coupling is disclosed in which the sleeve which is rotated to threadingly secure the coupling together is supported by ball bearings on the housing of the coupling. The ball bearings facilitate rotation of the sleeve to connect the coupling and also permit the sleeve to the body of the coupling to permit swiveling of the coupling under pressure.

---

The present invention relates to fluid couplings, and more particularly to a fluid coupling which is threaded together and which is designed to be operable under extremely high fluid pressures.

In modern hydraulic systems, fluid pressures of 5,000 pounds per square inch and more are not uncommon. The coupling of the present invention has a sleeve which is connected to the body of the coupling by anti-friction bearing means so that the sleeve of the coupling can be hand-tightened under extremely high fluid pressures, 5,000 pounds per square inch or more.

In both embodiments of the invention shown herein, the coupling is valved so that the fluid under pressure can be trapped in the lines of the coupling until such time as the coupling is assembled. When assembled, the valves are opened by the action of the assembly of the coupling.

It will be understood that the coupling of the present invention can be utilized without the internal valving shown in this specification if so desired.

The coupling of the present invention can be handtightened with the unique arrangement shown herein so that the hand-tightening will withstand pressures of over 5,000 pounds per square inch.

With the foregoing considerations in mind, it is an object of the present invention to provide a fluid coupling which will withstand extremely high pressures.

Another object of the present invention is to provide a fluid coupling which may be hand-tightened to withstand pressures of 5,000 pounds per square inch or more.

Another object of the present invention is to provide a fluid coupling which may be tightened under pressure, by hand, with pressures exceeding 5,000 pounds per square inch.

Another object of the present invention is to provide a coupling which can swivel under high pressure.

Another object of the present invention is to provide a coupling which has internal valving that is actuated to the open position by assembly of the coupling.

These and other objects of the present invention will become apparent as this description proceeds in conjunction with the accompanying drawings.

Figure 1:
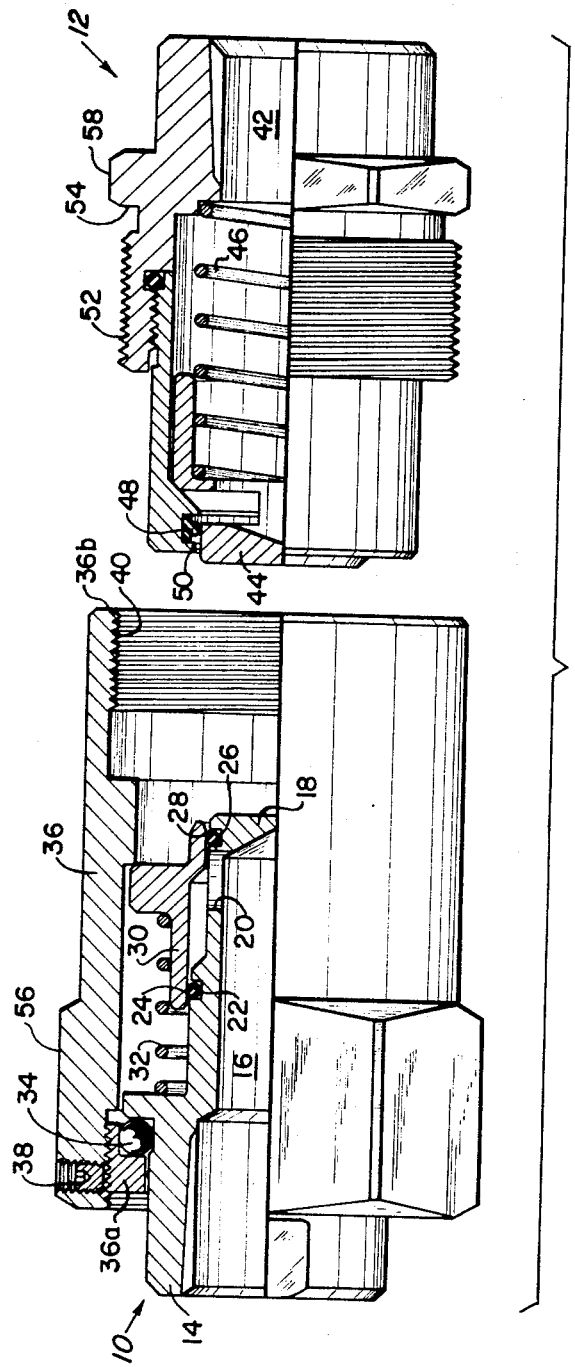
FIGURE 1 is a side view, in partial section, of one embodiment of the coupling of the present invention in the disengaged position.

Referring to the drawings, and particularly to FIG-

URES 1 and 2, a fluid coupling having a body member 10 and a nipple 12 is shown. The body member 10 has a generally cylindrical body 14 having a flow passage 16 formed therethrough. The nipple body 14 has a solid end wall 18. Radial flow passages 20 are formed in the body 14 to permit flow from the flow passage 16 radially through flow passages 20. An O-ring seal 22 is disposed in an annular groove 24 on the external surface of body 14. A second O-ring seal 26 is disposed in an annular groove 28 on the external surface of body 14. A cylindrical sleeve valve 30 (shown in the closed position in FIGURE 1 and in the open position in FIGURE 2) overlies the body 14 and is in sealing contact with O-ring seals 22 and 26 when in the closed position and in sealing contact with O-ring seal 22 when in the open position.

The cylindrical sleeve valve 30 is urged to the closed position, as seen in FIGURE 1, by the helical spring 32 disposed between the sleeve valve 30 and the body 14.

A plurality of ball bearings 34 are positioned about the periphery of body 14 and rotatably support a cylindrical sleeve 36. The cylindrical sleeve 36 has a bearing race 36a which is threaded into sleeve 36 and holds the ball bearings 34 captive. The sleeve 36 has an annular end wall 36b which contacts the nipple 12 in a manner to be described.

The bearing race 36a is retained within sleeve 36 by a set screw 38. Adjacent the end of cylindrical sleeve 36, internal threads 40 are formed within the sleeve 36.

The generally cylindrical nipple 12 has a flow passage 42 formed therethrough. A cylindrical internal valve 44 is disposed within the nipple 12 and is urged to the closed position, shown in FIGURE 1, by a helical spring 46.

Formed adjacent the end of nipple 12 is an annular groove 50 into which is positioned a seal ring 48. The seal ring 48 seals the cylindrical internal valve 44 when the cylindrical internal valve is in the closed position, and seals against the cylindrical sleeve valve 30 of body member 10 when the coupling is in the engaged position shown in FIGURE 2.

The cylindrical nipple 12 has external threads 52 formed thereon. The external threads 52 terminate adjacent an annular shoulder 54 extending radially outwardly of the threads 52 on the nipple 12. The annular shoulder 54 is formed on a portion of the nipple 12 that has a polygonal surface 58. The sleeve 36 of body member 10 also has a polygonal surface 56 formed thereon.

When the coupling is in the disengaged position shown in FIGURE 1, the cylindrical sleeve valve 30 is biased by spring 32 to the closed position. Likewise, the cylindrical internal valve 44 is biased by spring 46 to the close position. When the coupling is engaged, the internal threads 40 formed on sleeve 36 are threaded onto the external threads 52 formed on nipple 12. The threading is continued until the annular end wall 36b of sleeve 36 abuts the annular shoulder 54 on nipple 12.

This action causes the end wall 18 of body to bear against the cylindrical internal valve 44 and urge it to the open position. At the same time, the annular nipple 12 abuts the cylindrical sleeve valve 30 and urges it to the open position. The nipple 12, by seal ring 48, seals over the cylindrical sleeve valve 30. Thus, in the engaged position, the coupling takes the configuration shown in FIGURE 2.

Because of the anti-friction ball bearings 34, the sleeve 36 is extremely easy to turn relative to body 14. Further, when the sleeve annular end wall 36b abuts the nipple annular shoulder 54, the nipple 12 and the sleeve 36 rotate relative to body 14 over bearings 34 so that the coupling may swivel relatively easily after engagement.

Figure 2:
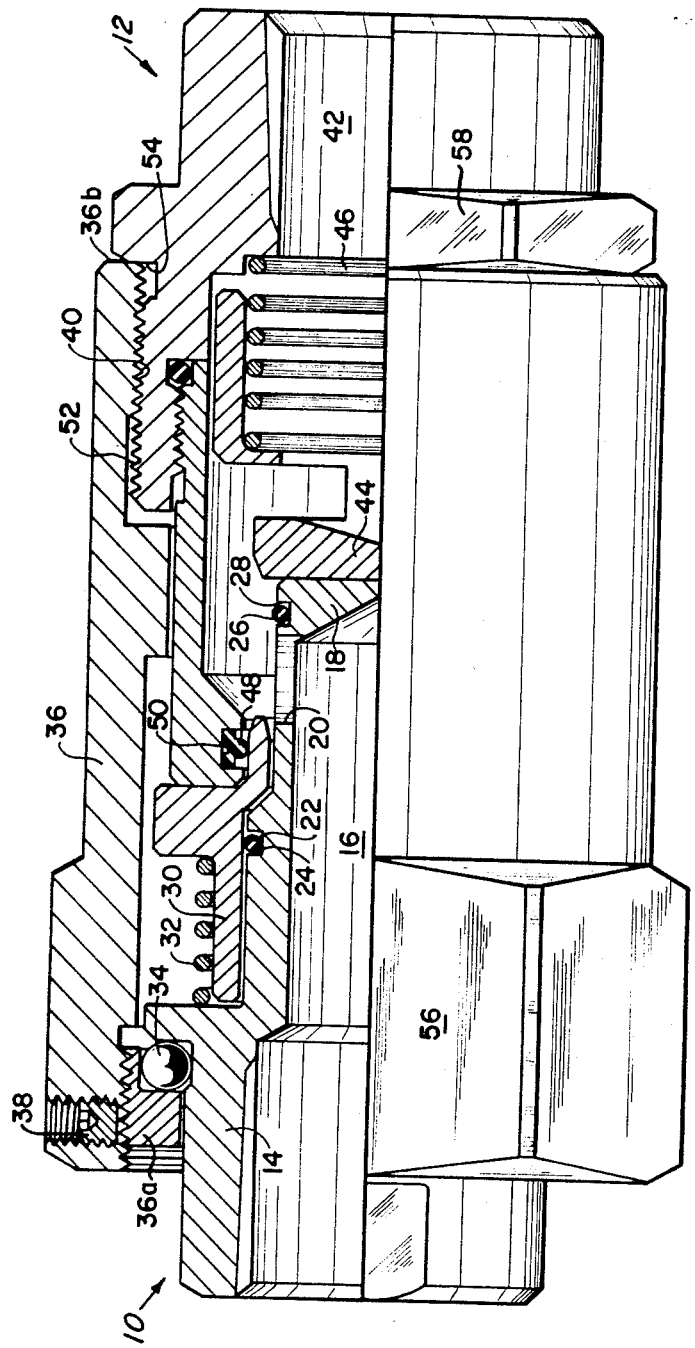
FIGURE 2 is a side view, in partial section, of the coupling of FIGURE 1 in the engaged position.

Because of the bearings 34 between sleeve 36 and body 14, the coupling of FIGURES 1 and 2 may be assembled under extremely high hydraulic pressures, pressures of 5,000 pounds per square inch or more.

Figure 3:
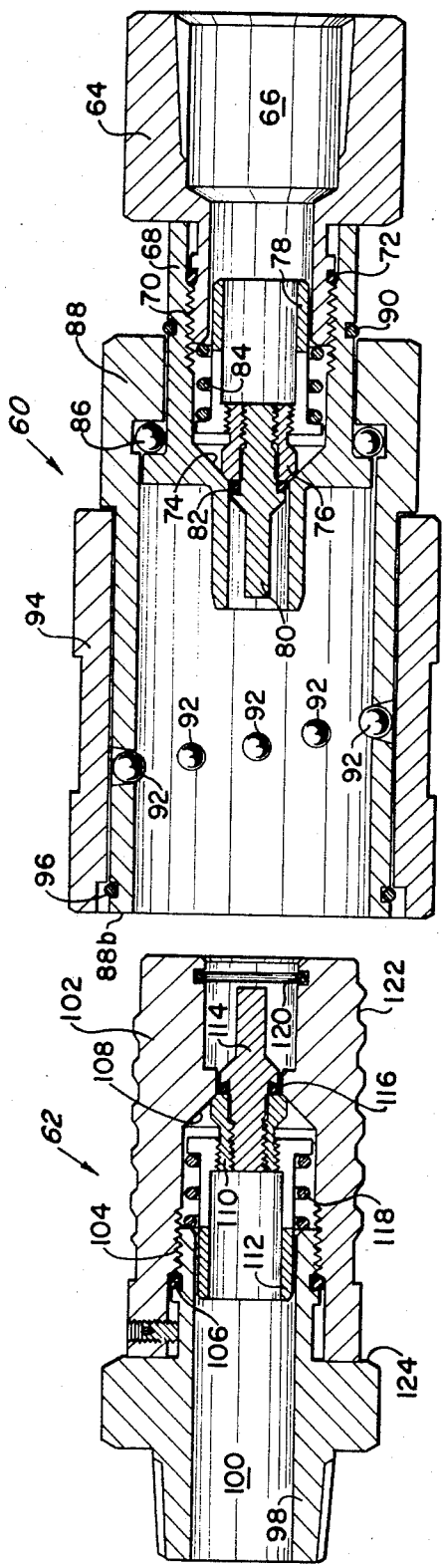
FIGURE 3 is a view, in section, of a second embodiment of the present invention in the disengaged position.
Figure 4:
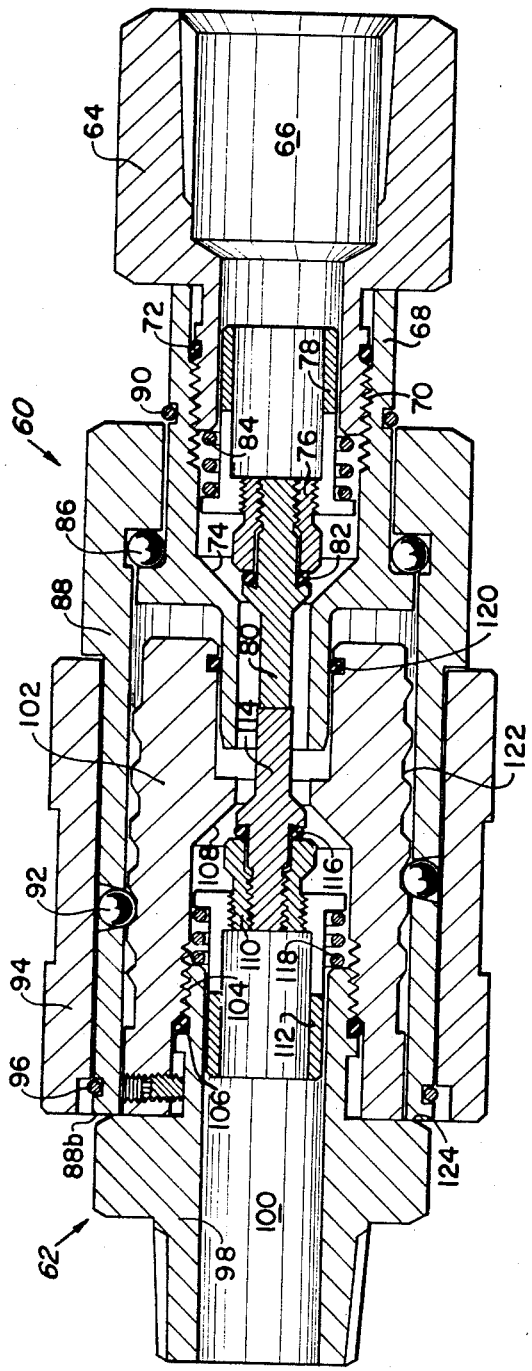
FIGURE 4 is a view, in section, of the coupling of FIGURE 3 in the engaged position.

Referring now to FIGURES 3 and 4, a second embodiment of the invention is shown therein. In FIGURES 3 and 4, a body member 60 and a nipple 62 are shown in the disengaged position in FIGURE 3. They are engaged in FIGURE 4.

The body member 60 has a generally cylindrical body 64 having a flow passage 66 formed therethrough. A body extension 68 is threaded onto body 64 by threads 70 and sealed thereto by O-ring 72. The body extension 68 has a conical valve seat 74 formed therein.

Within the body extension 68 is an internal valve element 76 that is threaded onto a cylindrical valve guide 78. A valve stem 80 is threaded into the valve element 76 and an O-ring seat 82 is trapped between stem 80 and internal valve element 76 to form a seal for the valve element 76 against the conical valve seat 74 when the valve is in the closed position as shown in FIGURE 3.

A helical spring 84 disposed between body 64 and valve guide 78 urges the valve to the closed position shown in FIGURE 3.

A plurality of ball bearings 84 are disposed between the body extension 68 and a cylindrical sleeve 88 which rotatably moves over the ball bearings 86. The cylindrical sleeve 88 has an annular end wall 88b formed at one end thereof. In assembly, the sleeve 88 is held in position by snap ring 90 positioned on the body extension 68.

The cylindrical sleeve 88 rotatably receives a plurality of captive balls 92 which protrude partially through holes formed in sleeve 88 and into the cylindrical space defined by the internal surface of sleeve 88. The balls 92 are positioned in a helical pattern within sleeve 88 and form internal thread means to receive the nipple 62 in a manner to be described. The balls 92 are held captive within sleeve 88 by an overlying sleeve 94 that is held in position axially by snap ring 96.

The nipple 62 has a nipple cylinder 98 having a flow passage 100 therethrough. The nipple extension 102 is threaded onto nipple cylinder 98 by threads 104 and sealed thereto by O-ring 106.

The nipple extension 102 has a conical valve seat 108 formed therein. Within the nipple extension 102 is an internal valve element 110 threaded into a cylindrical valve guide 112. A valve stem 114 is threaded into internal valve element 110 and holds captive an O-ring 116 which serves as a valve seat when internal valve element 110 is closed against the conical valve seat 108.

A helical spring 118 between nipple cylinder 98 and valve guide 112 urges the internal valve element 110 to the closed position as shown in FIGURE 3.

An O-ring 120 is positioned in the end of nipple extension 102 and seals onto the body extension 68 of body member 60 when a coupling is in the engaged position shown in FIGURE 4.

A continuous helical groove 122 is formed on the cylindrical external surface of nipple extension 102.

An annular shoulder 124 protrudes outwardly on nipple cylinder 98 to abut the annular end wall 88b of cylindrical sleeve 88 when the nipple is in the engaged position shown in FIGURE 4.

As with the embodiments of FIGURES 1 and 2, the coupling of FIGURES 3 and 4 is engaged by threading the sleeve 88 over the nipple extension 102. The captive balls 92 serve as internal thread means on sleeve 88 and the continuous helical groove 122 serves as external thread means on the nipple extension 102. The sleeve 88 is threaded over nipple extension 102 until the annular end wall 88b abuts the annular shoulder 124. As the nipple is being threaded into the sleeve 88, the valve stems 80 and 114 of the respective internal valve elements 76 and 110 axially abut each other and force the valve elements 76 and 110 away from their respective conical seats 74 and 108 to open the flow passage through the coupling.

Because of the ball bearings 86 and the captive balls 92, the sleeve 88 is easily threaded over the nipple extension 102. This can be done even at extremely high pressures of over 5,000 pounds per square inch.

After sleeve 88 is threaded completely onto nipple extension 102 and abuts the annular shoulder 124, the nipple 62 and the sleeve 88 turn as a unit relative to body 64 so that the coupling may swivel while it is in the engaged position shown in FIGURE 4.

According to the provisions of the patent statutes, I have explained the principle, preferred construction and mode of operation of my invention and have illustrated and described what I now consider to represent its best embodiments.

I claim:
1. A swiveling fluid coupling comprising:
(a) a generally cylindrical body having a fluid passage therethrough, said fluid passage having an overlying cylindrical sleeve valve urged to the normally closed position by a helical spring;
(b) a cylindrical sleeve overlying said body, said sleeve being longer than the external diameter of said coupling and having internal helical thread means formed at one end thereof and terminating in an annular end wall, and said sleeve having a separate annular bearing race retained in the other end thereof to receive ball bearings said cylindrical sleeve valve being at all times axially disposed between said helical threads and said bearing race whether said coupling is engaged or disengaged;
(c) ball bearing means positioned between said body and said sleeve bearing race to permit free relative rotation between said body and said sleeve;
(d) a generally cylindrical nipple having a fluid flow passage therethrough, said nipple having external helical thread means formed thereon, said nipple having an annular shoulder extending radially outwardly therefrom, and said nipple flow passage having a cylindrical internal valve urged to the closed position by a helical spring;
(e) the relative dimensions of said body, said cylindrical sleeve, and said nipple being such that when said nipple is threaded onto said sleeve until said sleeve annular end wall abuts said nipple annular shoulder, said flow passage of said nipple urges said sleeve valve of said body to the open position while said flow passage of said body simultaneously urges said valve of said nipple to the open position, both against the forces exerted by said helical springs so that a fluid flow passage is completed through said fluid coupling and said cylindrical sleeve and said nipple may swivel as a unit over said antifriction means relative to said body.

References Cited

UNITED STATES PATENTS

| 630,915 | 8/1899 | Myers | 308—236 |
| 696,777 | 4/1902 | Ward | 308—236 |
| 3,285,283 | 11/1966 | Calvin | 137—614.03 |
| 2,218,318 | 10/1940 | Pfauser | 137—614.04 |
| 3,205,911 | 9/1965 | Swick | 137—614.03 |

ALAN COHAN, *Primary Examiner.*

H. M. COHN, *Assistant Examiner.*

U.S. Cl. X.R.

285—276